United States Patent [19]

Stima

[11] 4,169,709

[45] Oct. 2, 1979

[54] ARTIFICIAL FIREPLACE LOGS

[75] Inventor: Joseph F. Stima, Edison, N.J.

[73] Assignee: Colgate-Palmolive Company, New York, N.Y.

[21] Appl. No.: 770,176

[22] Filed: Feb. 16, 1977

Related U.S. Application Data

[63] Continuation of Ser. No. 592,286, Jul. 1, 1975, abandoned.

[51] Int. Cl.$^2$ .................... C10L 5/00; C10L 9/00; C10L 10/00
[52] U.S. Cl. .................................... 44/10 R; 44/6
[58] Field of Search ............ 44/10 R, 6, 1 R, 1 C, 44/17

[56] References Cited

U.S. PATENT DOCUMENTS

| | | | |
|---|---|---|---|
| 1,205,020 | 3/1929 | Kohr | 44/6 |
| 2,219,565 | 10/1940 | Riemer | 44/1 R |
| 2,398,571 | 4/1946 | Young | 44/1 R |
| 3,297,419 | 1/1967 | Eyre, Jr. | 44/10 R |
| 3,370,932 | 2/1968 | Kelly et al. | 44/17 X |
| 3,726,651 | 4/1973 | Ronden | 44/10 R |
| 3,726,652 | 4/1973 | Schick | 44/17 X |
| 4,062,655 | 12/1977 | Bruckbank | 44/10 R |

*Primary Examiner*—Carl Dees
*Attorney, Agent, or Firm*—Richard N. Miller; Murray M. Grill; Herbert S. Sylvester

[57] ABSTRACT

An artificial fireplace log containing a metallic perchlorate provides a colored flame shortly after ignition of the log. In a preferred embodiment the metallic perchlorate is of a certain particle size which provides, in addition to the colored flame, a very pleasing crackling sound similar to that of a wood burning fire, using a log of fibrous cellulosic particles and a flammable material.

11 Claims, No Drawings

ARTIFICIAL FIREPLACE LOGS

This is a continuation of application Ser. No. 592,286 filed July 1, 1975, now abandoned.

BACKGROUND OF THE INVENTION

1. Field of the Invention

This invention relates to artificial fireplace logs which provide a colored flame shortly after ignition. A preferred embodiment provides, in addition to the colored flame, a realistic crackling sound similar to that of a wood burning fire.

2. Description of the Prior Art

Fireplaces have been used in homes over the years for a variety of reasons. Originally, the basic functions of fireplaces were for heating and cooking whereas, at present, they are used primarily to provide a visual type enjoyment which one derives from watching burning logs. The burning of logs produces many aesthetic effects, such as pleasant aromas, colored flames, crackling noises, among others. The type and condition of the wood used will determine to a major part the extent of these effects but, in general, all burning wood produces these aesthetic effects to some degree.

While the burning of wood logs in home fireplaces has been the predominant method for providing this aesthetic pleasure over the years, there has been an increasing demand for artificial fireplace logs. These logs are easier to purchase and store, and since their heat output (including flame heat) is much greater per pound than for an ordinary wood log, a pleasing, lasting fire may be made from only one log. Other advantages are that they are much safer and easier to kindle than wood logs and require little or no maintenance during their burning.

These logs are manufactured to burn for about 2–3 hours, and are usually made of a carrier material, such as sawdust, and a flammable material, e.g., wax, which are mixed together are then extruded under pressure to form the log. The logs are usually packaged in a combustible wrapper (e.g., paper) and are easily set on fire by placing the wrapped log on a fireplace grate and igniting the wrapper with a match. The wrapper may have an inner barrier, e.g., of polyethylene film, to protect against migration of the wax into the paper. Paper or other similar combustible material may be put in the fireplace with the log if the log is not so wrapped. Once ignited, the log will continue to burn with a flame until the wax is consumed.

Unfortunately, however, artificial logs do not truly simulate the asethetic effects produced by a wood burning log. The logs, for the most part, merely provide a flaming mass which has none of the actual characteristics of a wood burning fire. While attempts have been made to provide an artificial log product which would truly simulate a wood burning fire, these attempts have fallen short of their goal. The major thrust in this regard has been to add chemicals to the log to impart an attractive color, or colors, to the flames. Thus, for example, U.S. Pat. Nos. 3,297,419, 3,637,355, 3,660,055, 3,726,651 and 3,843,366 describe the constituents of conventional artificial fireplace logs and other adjuvants therein and methods of making the logs. In U.S. Pat. No. 3,637,355 it is indicated that when the known metallic flame coloring agents are used in such logs it is necessary to use another additive, namely a chlorinated vinyl polymer, in order to provide a colored flame almost immediately upon ignition. In applicant's experience the use of conventional metallic coloring agents, such as copper sulfate, does not itself give a colored flame until the log has been burning for a relatively long time such as about $\frac{1}{2}$ hour (which may constitute more than 15% of the total burning time). The same U.S. Pat. No. 3,637,355 also teaches that the incorporation of such known flame colorants as potassium nitrate and strontium nitrate gives undesirable rapid flaming, spitting and melting.

As far as applicant is aware, none of the prior art artificial fireplace log products provide a combination of an almost immediate flame color and a crackling sound similar to that of a wood burning fire upon ignition, and until the flammable material of the log is essentially consumed.

SUMMARY OF THE INVENTION

In accordance with one aspect of the invention the logs of the type described above contain an added metal perchlorate. It is found that the presence of small amounts of such material, e.g., from 0.1% to about 10%, even when uniformly distributed in the log and not concentrated at the surface, provides a colored flame very shortly after ignition of the log, within less than 5 minutes thereafter (e.g., within 2 minutes). The metal perchlorate is preferably wholly or partially copper perchlorate which in parts a desirable blue color to the normally yellow flame. Other preferred metal perchlorates include sodium perchlorate and strontium perchlorate.

In accordance with another aspect of the invention the perchlorate flame coloring agent is present, at least in part, in the form of particles of a size between about 6 mesh to about 16 mesh. The presence of such particles gives a realistic crackling sound. The proportion is generally controlled, within the range of about 0.1 to about 3%, preferably about 0.25 to about 1%, so as to give say about 1 crackle per minute or more, but preferably not too frequent crackles such as more than 10 per minute.

DETAILED DESCRIPTION OF THE INVENTION

Typical artificial fireplace logs burn with a flame and may comprise, for instance, about 30 to 60% of a fibrous cellulosic carrier material such as sawdust and about 40 to 70% of a flammable material such as wax. These logs are normally burned on a grate and usually remain essentially intact until the wax is consumed. Although it is not usually necessary, the logs may be turned over or otherwise moved during burning without breaking apart.

The fibrous cellulosic carrier material may be a porous material which absorbs the flammable fuel and serves as a substrate therefor. This invention has been practiced successfully with sawdust from pine, but other words, such as spruce, fir, cedar and various hardwoods may be suitable employed. The sawdust normally has a moisture content of less than 12%, and is preferably below about 10%. It is preferred that the major part of the sawdust, e.g., about 60%, more preferably at least 80% or 90% have a particle size range of about 1/32 inch to about ⅜ inch, preferably about 3/16 inch to ¼ inch, since the logs produced afford excellent burning characteristics when employed with the additives of this invention. For best burning characteristics it is preferred in the practice of this invention that the sawdust not be too fine, e.g., less than 40–60 mesh (U.S.

Sieve Series). Other carrier materials, such as charcoal, coal, coke, etc., may be employed but these may detrimentally affect the burning characteristics of the log and it is preferred that a cellulosic material such as sawdust be the major carrier material.

The other major ingredient of the fireplace log is a flammable material such as vaporizable flammable hydrocarbon (e.g. a petroleum fuel cut) which acts as the primary flame-supporting material. The material combines with the carrier to form a log which is dimensionally stable at room and handling temperatures and which, preferably, remains intact while burning. The hydrocarbon may be partially oxidized. It is preferably essentially non-aromatic, e.g., aliphatic. It is preferred to utilize vaporizable material which is substantially non-volatile at room temperature such as wax commonly known as slack wax (described in the prior art, as mentioned above), a product which is usually obtained from crude oil after the volatile material and useful lubricating oils are removed. This wax, in addition to being a flame-supporting material, acts as an excellent binder to hold the log together at room temperature and during burning. Depending on the refinery source and composition of the crude oil, the composition of the slack wax will vary but, in general, all slack waxes are a combination of oils, paraffin waxes and microcrystalline waxes. A highly preferred slack wax has a melting point range of about 120° F. to about 160° F. It will be obvious that the wax or other flammable material may include proportions of other agents added to impart certain desired characteristics, e.g., to improve extrudability, to enhance the hot strength of the log so it might be burned on andirons, etc., as is well known in the art.

A particularly satisfactory log in accordance with this invention may be formed by admixing pine sawdust having a moisture content of less than about 10% and wherein at least 90% of the particles having a particle size of about 3/16 inch to ¼ inch with melted slack wax (e.g., at 155° F.) having a melting point range of about 120°-160° F. The mixture is then cooled to about 90°-110° F. and the perchlorate is added with care to preserve its particle size and to avoid substantial deliquescence. The mixture is fed into an extruder under pressure to form a log having a density of preferably about 40 to 70 pounds per cubic foot, e.g., about 50 pounds per cubic foot, containing the perchlorate particles substantially uniformly distributed therein. The perchlorate, even though deliquescent, does not show significant deliquescence on storage of the logs presumably because the perchlorate particles are protected (e.g., encapsulated) by the wax or other hydrophobic water-insoluble binder. Adjuvants may be incorporated therein as discussed in the prior art mentioned above. For example, ammonium chloride, at levels up to about 3%, preferably about 2%, has been found to be beneficial since it acts as a flame retardant and flame dispersant, giving a flame which is discontinuous or irregular rather than a relatively uniform sheet of flame. The log may have a stripe of more highly flammable material running along its outer surface for substantially the whole length of the log so that on ignition the flame spreads rapidly over that length, enabling the log to be effectively and fully ignited readily with one match. Such a stripe can be, for instance, of gelled wax.

Particularly effective additives contemplated herein are metallic perchlorates. The metallic perchlorates have been found to provide a colored flame shortly after ignition which continues during the burning of the log and may be employed either singly or in combination to provide a multi-colored effect. Suitable metallic perchlorates include heavy metal, alkaline earth metal or alkali metal perchlorates, such as strontium, cupric and sodium. The metallic perchlorates may be incorporated in the log in an amount, by weight of the log, from about 0.1% to 10%, preferably less than about 5% and more preferably up to about 3%. Cupric perchlorate has been found to be particularly desirable since it imparts a natural blue color flame. Sodium perchlorate .H$_2$O and strontium perchlorate .6H$_2$O have also been found to be particularly desirable. Other metallic perchlorate salts may suitable be employed depending on the flame coloring characteristics desired. No chlorinated organic material is needed to give early coloration after ignition, and preferably substantially no chlorinated organic material such as polyvinyl chloride is present.

It has been found that the metallic perchlorates also provide a crackling sound similar to that of a wood burning log when the particles have a size of about 6 mesh to about 16 mesh, preferably 8 mesh to 12 mesh. To provide a realistic crackling sound similar to that of a wood burning fire the proportion of particles of that size are generally controlled within the range of about 0.1% to about 3%, and preferably about 0.25% to about 1%, e.g., 0.5%. At high concentrations, these larger size particles will provide a number of crackling sounds which is greater than that produced by a normal wood burning fire, to wit, about 1 to 10 crackles per minute.

In carrying the invention into practice, it is preferred that the metallic perchlorates be incorporated in the log so that, for example, there is less than about 1% of the 6 mesh to 16 mesh particles size range and about 1 to 2% or even 9% of smaller metallic perchlorate particles, this combination of particle sizes providing a highly colored flame and a crackling sound characteristic similar to that of a wood burning fire. A particularly preferred concentration is from about 0.1% to about 0.25%, or 0.5% of particles having a 6 to 16 mesh size and about 0.1% to about 1%, e.g., 0.5% of a smaller particle size. The proportion of large size to small size particles may be controlled to produce desired color, flaming and crackling effects as will be appreciated by those skilled in the art.

As a further feature of the invention, other components which produce a crackling effect, e.g., gravel or other crystalline particles, may be employed in combination with the smaller size perchlorate or even with larger size metallic perchlorates to produce a crackling sound effect in the log. It is preferred, however, to employ only a single additive to provide both a colored flame and a crackling effect and this can conveniently be accomplished by the use of metallic perchlorating having a mixture of particle sizes as discussed hereinabove.

Various embodiments of the present invention will now be illustrated by reference to the following specific examples. It is to be understood, however, that such examples are presented for purposes of illustration only and the present invention is in no way to be deemed as limited thereby.

EXAMPLE I

A fireplace log having a diameter of 3 inches and a length of 16 inches is prepared having a composition, containing nominally by weight, about 37.5% pine sawdust having a moisture content less than about 10%, 60% of flammable binder (slack wax having a melting point range of 120° F.–160° F.), 2% ammonium chloride, and 0.5% cupric perchlorate .6H$_2$O . The sawdust is pulverized in a hammer mill with about 90% of the pulverized sawdust having a particle size between about 3/16 inch and ⅜ inch and the remaining 10% having a particle size smaller than 3/16 inch. Molten flammable binder at a temperature of about 160° F. is added to the sawdust and the mixture blended in a ribbon mixer until homogeneous. The mixture is cooled during blending to about 90°–110° F. and the ammonium chloride and cupric perchlorate .6H$_2$O particles are then quickly added to avoid deliquescence of the perchlorate. The mixture is blended at this temperature until the ammonium chloride and cupric perchlorate .6H$_2$O are uniformly distributed therein and while at this temperature the mixture is then fed into an extruder and the log formed.

The ammonium chloride has a particle size range of about 20 to 40 mesh. The cupric perchlorate .6H$_2$O particles are individual crystals having a particle size range of about 6 to 30 mesh with approximately 50% having a range of 6 to 16 mesh and the major part of the remainder (which includes some dust) having a range of about 16 to 30 mesh.

The log is tested for flame coloring and crackling characteristics by placing the log on a fireplace grate and burning. The log is ignited and a blue colored flame is noted within about 2 minutes from the time the log starts to burn and this blue flame continues during the burning of the log. A crackling sound, similar to that of a wood burning fire, is produced at about 2 minutes after the log starts to burn and the crackling sound continues at a rate of about 1 to 10 crackles per minute during the burning thereof. Some of the crackle sounds (at least about 1 every 2–3 minutes) are accompanied by blue flashes of color which enhance the aesthetic qualities of the burning log.

EXAMPLE II

A fireplace log is prepared and tested using the same formulation and procedures as set forth in Example I with the exception that the log contains only 0.20% cupric perchlorate .6H$_2$O and 0.05% strontium perchlorate; and more sawdust is added to compensate for the decreased level of the perchlorate addition. The cupric perchlorate and strontium perchlorate have a particle size distribution essentially as set forth in Example I for the cupric perchlorate.

The burning log is characterized by burning with a colored flame and producing a crackling sound similar to that of a wood burning fire shortly after ignition (within about 2 minutes). Compared to the log of Example I, it is characterized by burning with less flame coloring and fewer crackles, e.g., about 1–5 per minute. During the burning it is noted that the flame color is predominantly blue with small areas of red. Pleasing flashes of blue and/or red color are seen at least about once every five minutes with the blue flashes predominating.

Accordingly, it is clear that the objects of this invention set forth at the outset of the specification, have been successfully achieved. The invention has been disclosed and described with respect to certain preferred embodiments and various modifications thereof will become obvious to one skilled in the art. It is to be understood that such modifications and variations are to be included within the spirit and scope of the invention which is not limited to the exemplary embodiments, but is defined only by the claims. All proportions herein are by weight and mesh sizes are U.S. Sieve Series unless otherwise indicated.

I claim:

1. In an artificial fireplace log which burns with a visible flame and comprises, by weight, an extruded mixture of 30% to 60% of porous, fibrous, cellulose particles and about 40% to 70% of a flammable hydrocarbon which acts as the primary flame-supporting material, the improvement wherein 0.1% to 3% by weight of particles of a metallic perchlorate having a size between about 6 mesh and about 16 mesh and selected from the group consisting of cupric perchlorate, sodium perchlorate, strontium perchlorate and mixtures thereof are uniformly distributed therein, said perchlorate being effective to provide a combination of an almost immediate flame color and a crackling sound similar to that of a wood-burning fire upon ignition and until the flammable material of the log is essentially consumed.

2. A log as in claim 1 which further includes particles of said metallic perchlorate of a particle size smaller than 16 mesh and the total weight of metallic perchlorate is from 0.1 to 10% by weight.

3. A log as in claim 2 wherein said metallic perchlorate of 6 mesh to 16 mesh size is present in an amount of 0.25% to 1% by weight and said metallic perchlorate of a particle size smaller than 16 mesh is present in an amount of 1% to 9% by weight.

4. A log as in claim 2 in which said perchlorate is a deliquescent material and said particles of perchlorate are encapsulated by said flammable hydrocarbon material.

5. A log as in claim 2 wherein the cellulosic particles are sawdust and the flammable hydrocarbon is slack wax having a melting point range of about 120° F.–160° F.

6. A log as in claim 5 wherein at least about 90% of the sawdust has a particle size range of about 1/32 inch to about ⅜ inch.

7. A log as in claim 3 wherein the amount of metallic perchlorate having a particle size of about 6 to 16 mesh is about 0.1% to about 0.5% and the amount of metallic perchlorate having a smaller particle size is from about 0.1% to about 0.5%.

8. A log as in claim 2 wherein the metallic perchlorate is cupric perchlorate .6H$_2$O.

9. A log as in claim 2 further containing ammonium chloride in an amount up to about 3%.

10. A log as in claim 3 wherein the metallic perchlorate is a mixture of cupric perchlorate and strontium perchlorate.

11. A process of making an artificial fireplace log as defined in claim 1 comprising the steps of (a) admixing 30% to 60% by weight of a porous, fibrous, particulate, cellulosic material having a moisture of below 10% by weight with at least 90% thereof having a particle size of about 1/32 to ⅜ inch with 40% to 70% by weight of flammable hydrocarbon in liquid form at a temperature of about 120° F. to 160° F., (b) cooling the resultant mixture to a temperature of about 90° F. to 110° F., (c) adding said metallic perchlorate in particulate form to said mixture while continuing mixing until said perchlorate is uniformly distributed therein, (d) feeding said mixture to an extruder under pressure to form a log having a density of 40 to 70 pounds per cubic foot.

* * * * *